United States Patent [19]

Normile

[11] Patent Number: 5,917,964
[45] Date of Patent: Jun. 29, 1999

[54] METHOD AND APPARATUS FOR PRE-PROCESSING IMAGE DATA OF ENCODERS

[75] Inventor: James Oliver Normile, Woodside, Calif.

[73] Assignees: LG Electronics, Inc., San Jose, Calif.; James Normile, Atherton, Calif.

[21] Appl. No.: 08/773,528

[22] Filed: Dec. 23, 1996

[51] Int. Cl.[6] .................................................... G06K 9/32
[52] U.S. Cl. ........................................... 382/300; 382/243
[58] Field of Search .................................... 382/300, 209, 382/218, 236, 240, 260, 263, 232, 298, 299, 243

[56] References Cited

U.S. PATENT DOCUMENTS

| | | | |
|---|---|---|---|
| 5,048,111 | 9/1991 | Jones et al. | 358/12 |
| 5,384,869 | 1/1995 | Wilkinson et al. | 382/56 |
| 5,481,307 | 1/1996 | Goldstein et al. | 348/464 |
| 5,535,288 | 7/1996 | Chen et al. | 382/30 |
| 5,628,208 | 5/1997 | Harney | 348/402 |
| 5,636,293 | 6/1997 | Linet et al. | 382/205 |

*Primary Examiner*—Christopher S. Kelley
*Assistant Examiner*—Sheela Chawan
*Attorney, Agent, or Firm*—Peninsula Law Group; Daniel Hopen

[57] ABSTRACT

An apparatus for encoding input images and methods of operating the same result in a video encoder that improves compression performance of the video encoder engine. The video encoder comprises image interpolation resources configured to interpolate an input image to provide an interpolated input image. Block matching resources is coupled to the image interpolation resources having a last encoder input image to provide a best match input image from the interpolated input image in response to the last encoder input image. An encoder engine is coupled to the block matching resources to provide the last encoder input image to the block matching resources and to encode the best match input image.

18 Claims, 6 Drawing Sheets

METHOD AND APPARATUS FOR PRE-PROCESSING IMAGE DATA OF ENCODERS

BACKGROUND OF THE INVENTION

1. Field of the Invention

The present invention relates to processing image data by encoders and more particularly to adaptively processing of the image data to improve encoder performance.

2. Description of the Related Arts

As the Internet becomes more and more popular, more and more information are being assimilated using the Internet. Today, the wide variety of information available on the Internet includes data formats ranging from simple text files to complex Java™ applets. Because most people access the Internet using fixed rate channels such as telephone lines, complex data intensive information such as images presents undesirable lag times associated with the downloading of the complex data.

Video sequences require even more time than still images Data compression is used to reduce the amount of data for transmission over limited bandwidth channels such as the Internet. Compressing data often leads to alteration of the original uncompressed data depending on the severity of the compression process.

Compression of video images poses particular problems which result from the enormous amount of data associated with motion images. Traditional turn key indiscriminate compressing of video images often yields undesirable effects from the compression process. Often times, such compression processes will generate excessive encoded data that increases the amount of data to be transferred. Moreover, the excessive encoded data produces little or no marginal gains in terms of improved quality to the reconstructed images. In other instances, undesirable artifacts from the compression process are also introduced to the reconstructed images.

Therefore, it is desirable to provide an apparatus and methods of operating the same which process input images to improve the encoding of the input images and produce improved reconstructed images.

SUMMARY OF THE INVENTION

The present invention provides an apparatus for adaptively processing input images and methods for operating the same which result in improved reconstructed images. The novel improved encoder is based on pre-processing of the input images to improve the effectiveness of the encoder engine. Thus, according to one aspect of the invention, a video encoder comprises image interpolation resources configured to interpolate an input image to provide an interpolated input image. Block matching resources is coupled to the image interpolation resources having a last encoder input image to provide a best match input image from the interpolated input image in response to the last encoder input image. An H.263 (International Telecommunication Union standard) encoder engine coupled to the block matching resources to provide the last encoder input image to the block matching resources and to encode the best match input image. The best match input image improves the effectiveness of the H.263 encoder engine.

According to another aspect of the invention, the interpolated image provides an enlarged input image to provide a sufficiently large stable image for encoding. The block matching resources includes block comparator resources which compares the last encoder input image with the interpolated input image to provide the best match input image.

According to another aspect of the invention, the block comparator determines optimal image offset between the last encoder input image and a region of the interpolated image. The optimal image offset includes an absolute difference between pixels of the last encoder input image and the interpolated image. Thus, the block comparator locates regions of the interpolated image and the last encoder input image which changed the least so that the H.263 encoder engine is more effective in performing motion estimation for the best match input image.

According to yet another aspect of the invention, image filtering resources is coupled between the block matching resources and the H.263 encoder engine configured to filter rapid variations in luminance of the best match input image. High pass filtering resources determines high frequency luminance components of the best match input image. Data base resources is configured to store absolute values of the high frequency luminance components of the best match input image.

According to a further aspect of the invention, data rate control resources is coupled to the H.263 encoder engine having a filter threshold output configured to control encoded data rates from the H.263 encoder engine. The image filtering resources includes luminance filtering resources having a filter threshold input to filter the high frequency luminance components in response to a filter threshold signal from the data rate control resources. The luminance filtering resources uses the database resources to suppress the high frequency luminance components having higher absolute values, causing rapid variations in luminance of the best match input image to be filtered. Filtering the rapid variations in the luminance improves the effectiveness of the H.263 encoder engine.

An apparatus and method for operating a improved encoder are provided by preprocessing input images to the encoder engine. Improved encoding performance of the encoder engine is achieved through altering input images to improve the effectiveness of the encoder engine. Suppressing regions of rapid variations in the luminance signal further enhances the effectiveness of the encoder engine. Thus, encoded images of the improved encoder produce improved reconstructed images and the enhanced efficiency of the encoder engine provides a reduction of encoded image data.

Other aspects and advantages of the present invention can be seen upon review of the figures, the detailed description, and the claims which follow.

DETAILED DESCRIPTION OF THE INVENTION

Figure 1:
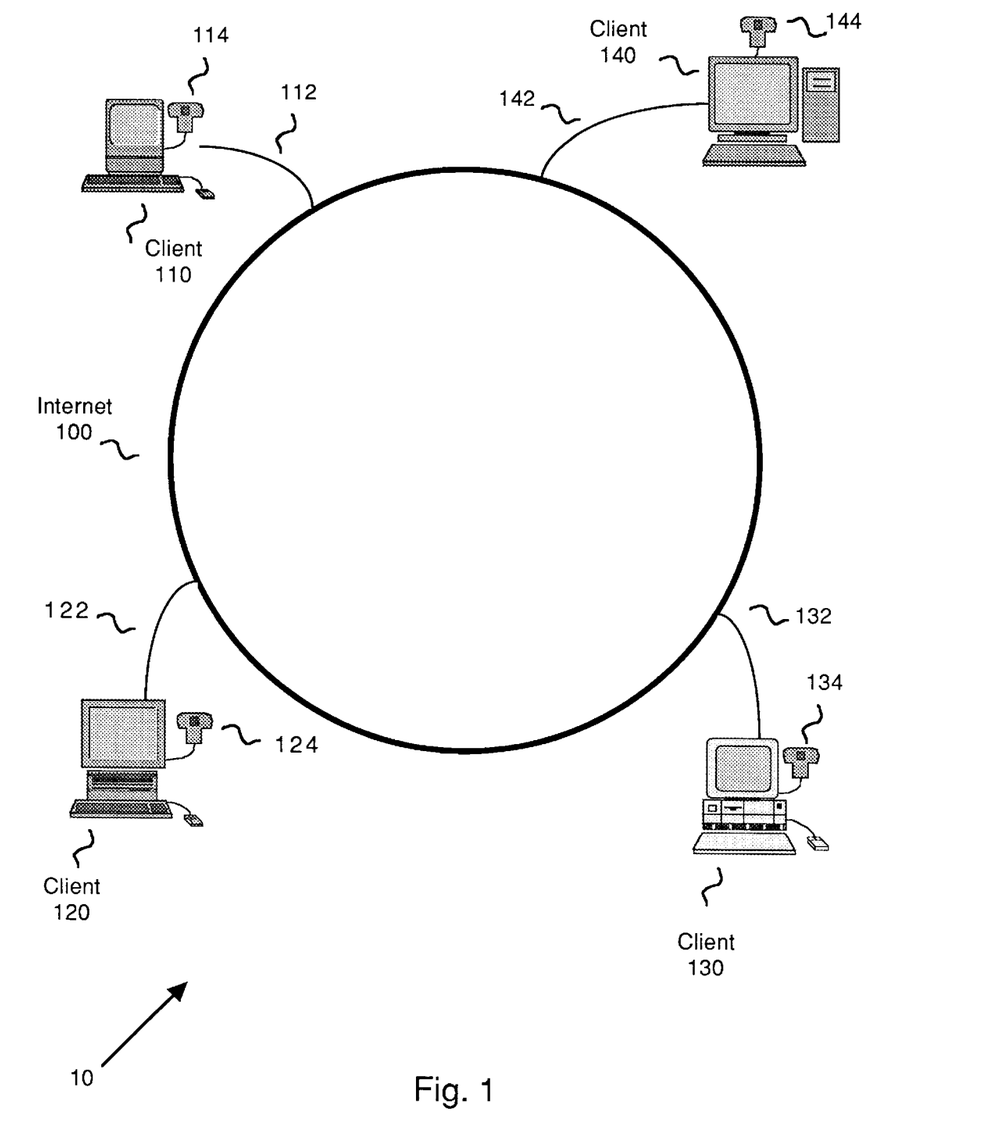
FIG. 1 illustrates a system level block diagram of a video conferencing system.

The invention will be described with respect to the Figures in which FIG. 1 generally shows a video conferencing system 10. The video conferencing system 10 includes an Internet 100, client 110, client 120, client 130, and client 140. The Internet 100 provides TCP/IP (Transmission Control Protocol over Internet Protocol). Other represented segments operating the TCP/IP including intranets and local area networks are also suitable.

Network connection 112 provides the client 110 access to the Internet 100. Network connection 122 provides the client 120 access to the Internet 100. Network connection 132 provides the client 130 access to the Internet 100. Network connection 142 provides the client 140 access to the Internet 100. Clients 110, 120, 130, and 140 include logic circuits that are programmed to perform a series of specifically identified operations for video conferencing on the Internet 100. Video camera 114 provides audio/video data from client 110 for transfer to another client on the Internet 100. Client 140 for example, is configured to receive the audio/video data from client 110 and transfers the audio/video data from camera 144 to client 110 on the Internet 100. Similarly, client 120 includes camera 124, and client 130 includes camera 134 for video conferencing on the Internet 100. Thus, clients 110, 120, 130, and 140 include video conferencing links via the Internet 100 to provide video conferencing between the clients.

Figure 2:
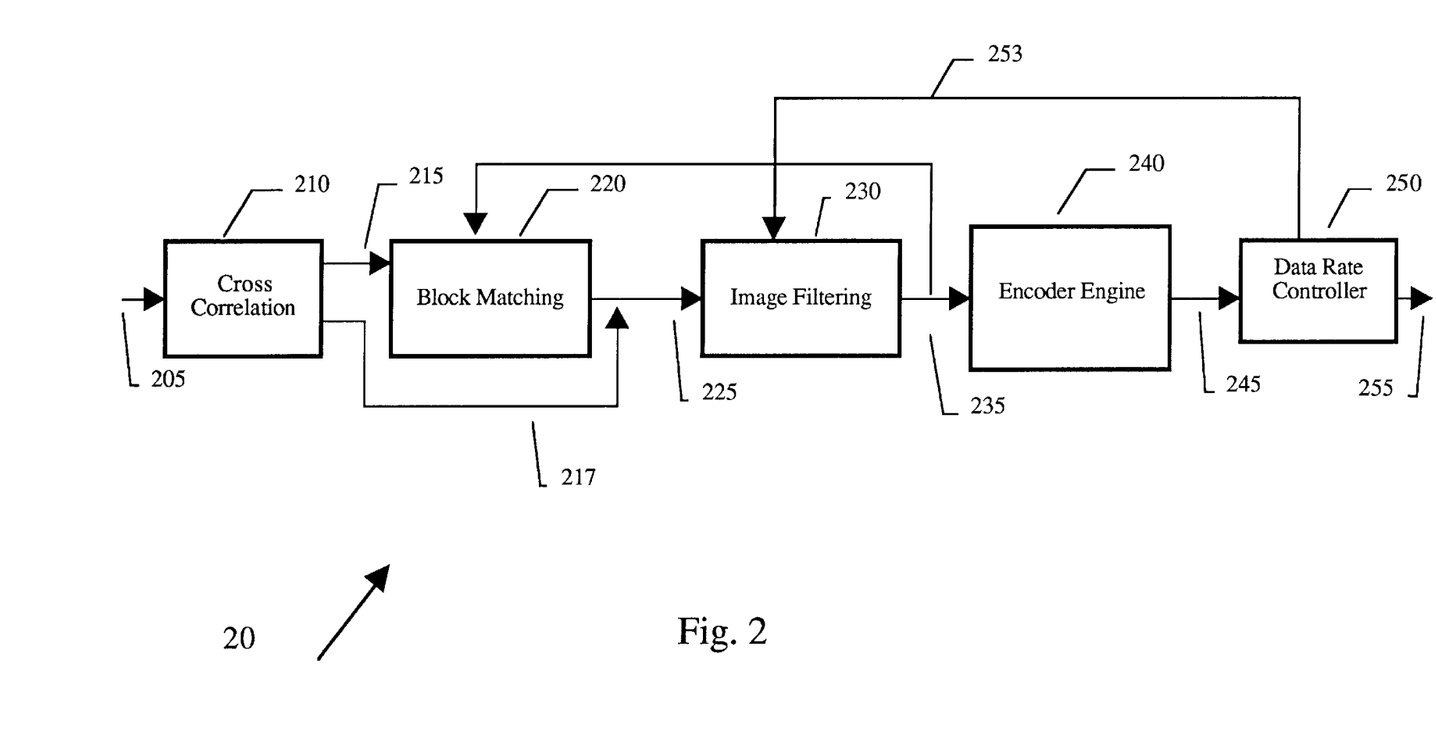
FIG. 2 illustrates a block diagram of an adaptive image encoder in accordance to the present invention.

FIG. 2 shows a block diagram of an adaptive image encoder 20 in accordance to the present invention. The adaptive image encoder 20 encodes image data that are applicable to video conferencing between clients. The adaptive image encoder 20 includes a cross correlation block 210, block matching block 220, image filtering block 230, an encoder engine 240, and a data rate controller 250.

The cross correlation block 210 receives input images from video cameras or other sources on line 205. The cross correlation block 210 includes resources that determines whether the range of motion from one image to the next exceeds the range possible for the encoder engine 240. If the cross correlation block 210 determines that the range of motion for the input images are within the range of possible for the encoder engine 240, the cross correlation block 210 directs the input images on line 217 to the image filtering block 230 on line 225.

However, many times, camera jitter or other image distorting factors cause an image sequence to exceed the range of motion possible for quality image encoding by the encoder engine 240. As the cross correlation block 210 determines that the range of motion of the input sequence exceeds the range possible for the encoder engine 240, motion stabilization to the image sequence is applied to improve encoding of the image sequence. To effect motion stabilization, the cross correlation block 210 includes resources that extracts a smaller unstable input image from the input image which is unstable to provide the smaller stable input image to the block matching block 220 on line 215.

The block matching block 220 maximizes correlation which minimizes distortion between image blocks of a last encoder input image of the encoder engine 240 and image blocks of the current input image to effect stabilization of the image sequence. The block matching block 220 receives the smaller unstable image on line 215 and interpolates the smaller unstable image horizontally and vertically to provide an interpolated image window large enough that enables a search of the interpolated window to find a stable image sufficiently large for encoding. The search of the interpolated window produces a best match image that closest matches the last encoder input image of the encoder engine 240. The best match image establishes an image that has the least distortion when matched with the last encoder input image of the encoder engine 240 and is the output of the block matching block 220 on line 225. A similar approach is applicable to a modified block matching block for correcting rotational distortion in an input image. The correction for rotational distortion involves maximizing correlation between image blocks of a last encoder input image and an unstable image while twisting around a center axis.

The image filtering block 230 receives the best match image on line 225 and filters the best match image to suppress rapid variations of luminance components to improve performance of the encoder engine 240. Often times, the luminance components in regions of an input image cannot be encoded efficiently. This leads to block-like artifacts in the reconstructed images. The image filtering block 230 includes resources that determines a value for the magnitude of the high frequency component of the luminance at each pixel location and sorts the values based on the frequency of occurrence. The cumulative frequency of occurrence provides control information as to the extent of pixels of the best match image that corresponds to a particular magnitude for the high frequency component of the luminance.

The data rate controller 250 provides a luminance filter threshold signal on line 253 to the image filtering block 230. The filter threshold signal establishes a designated maximum value for the magnitude of the high frequency component of the luminance that is suppressed in regions of the best match image. Thus, the image filtering block 230 in response to the luminance filter threshold signal on line 253 suppresses the magnitudes of the high frequency component of the luminance of the best match image having values above the designated maximum value. The image filtering block 230 provides a filtered best match image on line 235 to the encoder engine 240. The filtered best match image provides an encoder input image to the encoder engine 240.

The encoder engine 240 encodes the encoder input image consistent with transform based motion estimation encoding to provide a plurality of display frames wherein each display frame includes a plurality of display blocks. Video encoding techniques such as H.261 and H.263 and H263+ and MPEG4 standards are also encoded in a similar manner.

For example, each picture is divided into groups of blocks (GOBs). A group of blocks (GOB) includes multiples of 16 lines depending on the picture format. Each GOB is divided into macroblocks. A macroblock relates to 16 pixels by 16 pixels of y, the luminance, and the spatially corresponding 8 pixels by 8 pixels of u and v, the two color components. Further, a macroblock includes four luminance blocks and the two spatially corresponding color difference blocks. Each luminance or chrominance block relates to 8 pixels by 8 pixels of y, u or v. A more detailed description is contained in Document LBC-95-251 of the International Telecommunication Union Telecommunication Standardization Sector Study Group 15 entitled "Draft Recommendations H.263 (Video coding for low bitrate communication)", contact Karel Rijkse, Tel: +31 70 332 8588; the Draft Recommendations H.263 (Video coding for low bitrate communication) is herein incorporated by reference in its entirety.

The encoder engine 240 provides encoded image data to the data rate controller 250 on line 245. The data rate controller 250 includes resources that monitors the encoded image data rate on line 245 to determine the effectiveness of the encoding achieved by the encoder engine 240. If the data rate controller 250 monitors excessive encoded image data rates, the data rate controller 250 issues a filtering threshold signal on line 253 to increase suppression of the high frequency luminance components from the image filtering block 230. Often times, excessive encoded image data rates indicate ineffective encoding from the encoder engine 240. On the other hand, if the data rate controller 250 monitors reduced encoded image data rates, the data rate controller 250 issues a filtering threshold signal on line 253 to increase the high frequency luminance components of the best match image for encoding by the encoder engine 240 because often times, increasing low encoded image data rates produce improved encoded image data. Thus, the data rate controller 250 manipulates the luminance components of the best match image to produce effective encoding of images from the encoder engine 240. The data rate controller 250 provides transform based encoded images on line 255 for output.

Figure 3:
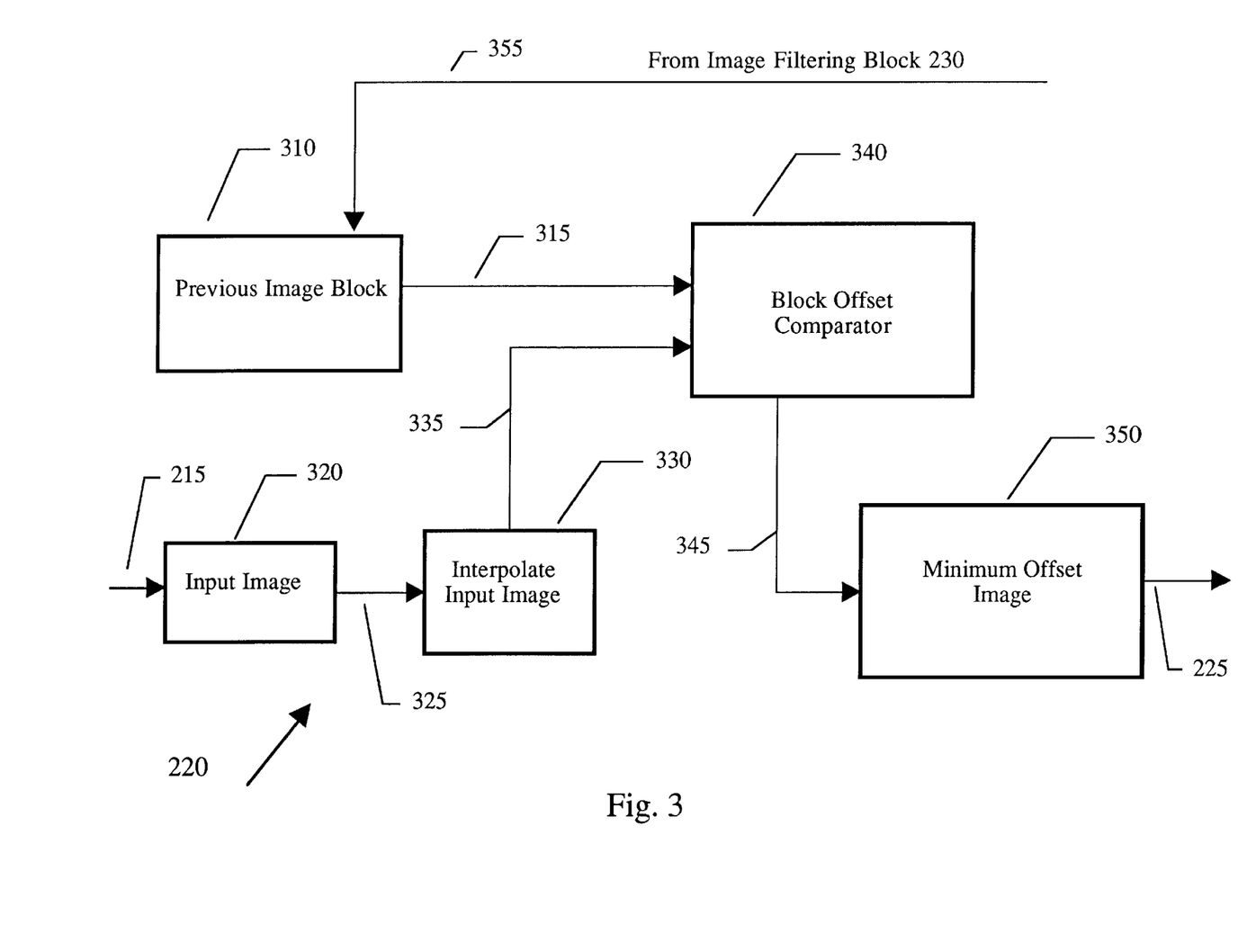
FIG. 3 illustrates a block diagram of the block matching block of the adaptive image encoder.

FIG. 3 shows a block diagram of the block matching block 220 of the adaptive image encoder 20. The block matching block 220 includes previous matching block 310, input image block 320, interpolate input image block 330, block offset comparator 340, and minimum offset image block 350. The input image block 320 receives the smaller unstable image on line 215 from the cross correlation block 210 and provides the input to the interpolate input image block 330 on line 325. The interpolate input image block 330 interpolates the smaller unstable image horizontally and vertically to provide an expanded unstable image on line 335 to the block offset comparator 340.

The previous image block 310 receives a last encoder input image from the output of the image filtering block 230 on line 235 and provides the last encoder input image to the block offset comparator 340 on line 315. As the block offset comparator 340 receives the last encoder input image and the expanded unstable image, resources of the block offset comparator 340 performs a search of the expanded unstable image to find a best match image.

To find the best match image, the block offset comparator 340 moves the last encoder input image from the output of the image filtering block 230 over the expanded unstable image and measures image offsets between pixels of the last encoder input image and pixels of the expanded unstable image. The block offset comparator 340 calculates sums of the absolute differences of the image offsets and selects the best match image from the image having a minimum absolute offset sum for the compared blocks. The minimum absolute offset sum provides the optimal offset for the best match image. Thus, the block offset comparator 340 determines the best match image from the image blocks which most correlates with the last encoder input image and produces the least distorted last encoder input image. The minimum offset image block 350 receives the best match image on line 345 from the block offset comparator 340 and provides the best match image on line 225 to the image filtering block 230.

Figure 4:
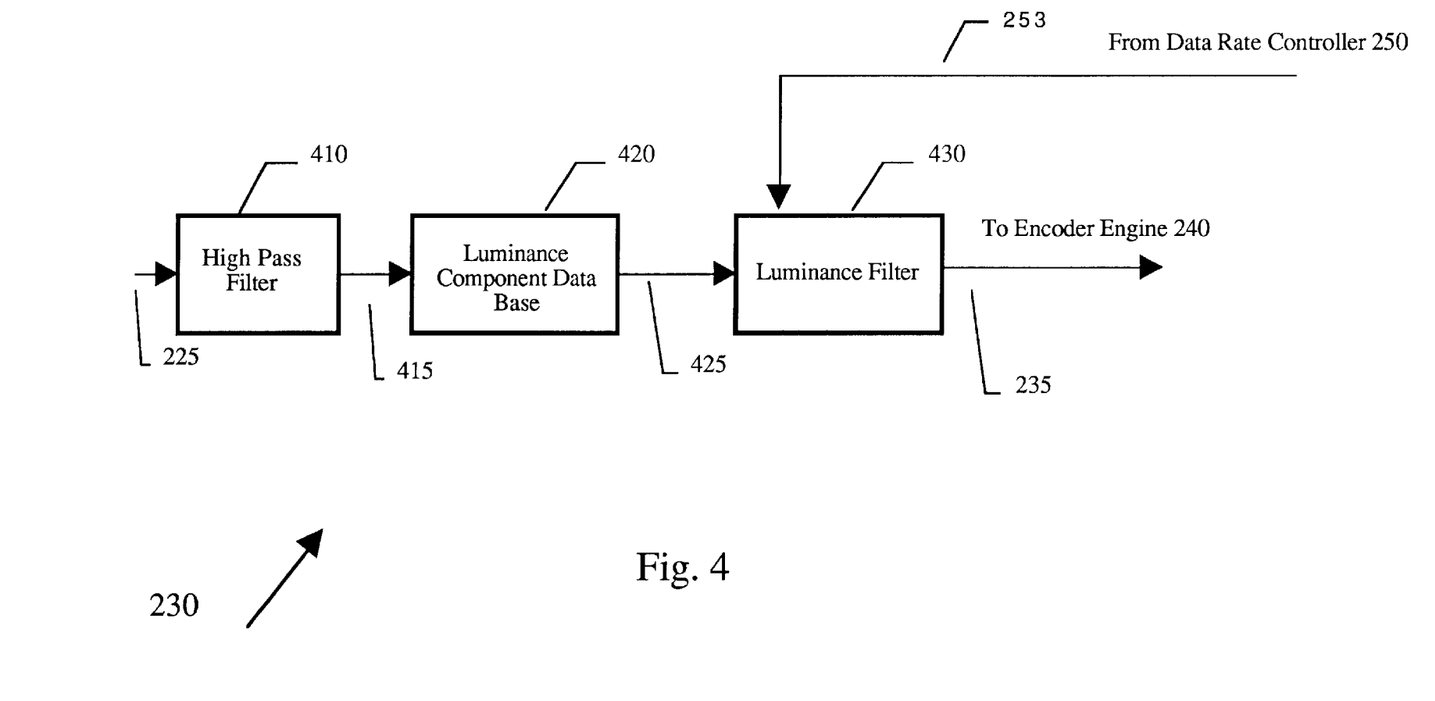
FIG. 4 illustrates a block diagram of the image filtering block the adaptive image encoder.

FIG. 4 shows a block diagram of the image filtering block 230 of the adaptive image encoder 20. The image filtering block 230 includes high pass filter block 410, luminance component data base block 420, and a luminance filter block 430. The high pass filter block 410 provides two dimensional pixel to pixel filtering of luminance components of input images received on line 225. In other words, the high pass filter block 410 filters the magnitude of the high frequency component of the luminance at each pixel of an input image. For each pixel of the input image, the high pass filter block 410 determines an absolute value of the magnitude of the high frequency component of the filtered luminance.

The luminance component data base 420 receives the absolute values of the magnitudes of the high frequency component of the filtered luminance on line 415 and includes resources that sorts the absolute values in a descending order along with their associated frequency of occurrence. The sorted absolute values of the magnitudes of the high frequency component of the luminance provide a mapping of regions of the input image having rapid variations in the luminance signal.

The luminance filter block 430 receives the mapping of the luminance signal of the input image on line 425 and the luminance filtering threshold signal on line 253 from the data rate controller block 250. The luminance filter block 430 includes resources responsive to the luminance filter signal on line 253 to filter the magnitudes of the high frequency component of the luminance of the input image based on the mapping of the luminance signal to suppress rapid variations in the luminance signal of the input image. The output of the luminance filter block 430 on line 235 provides the input to the encoder engine 240. The rapid variations of the luminance signal suppressed represent regions of the input image that produce ineffective encoded data. Thus, by suppressing regions having rapid variations in the luminance signal of the input image, the encoder engine 240 improves encoding effectiveness of the input images.

Figure 5:
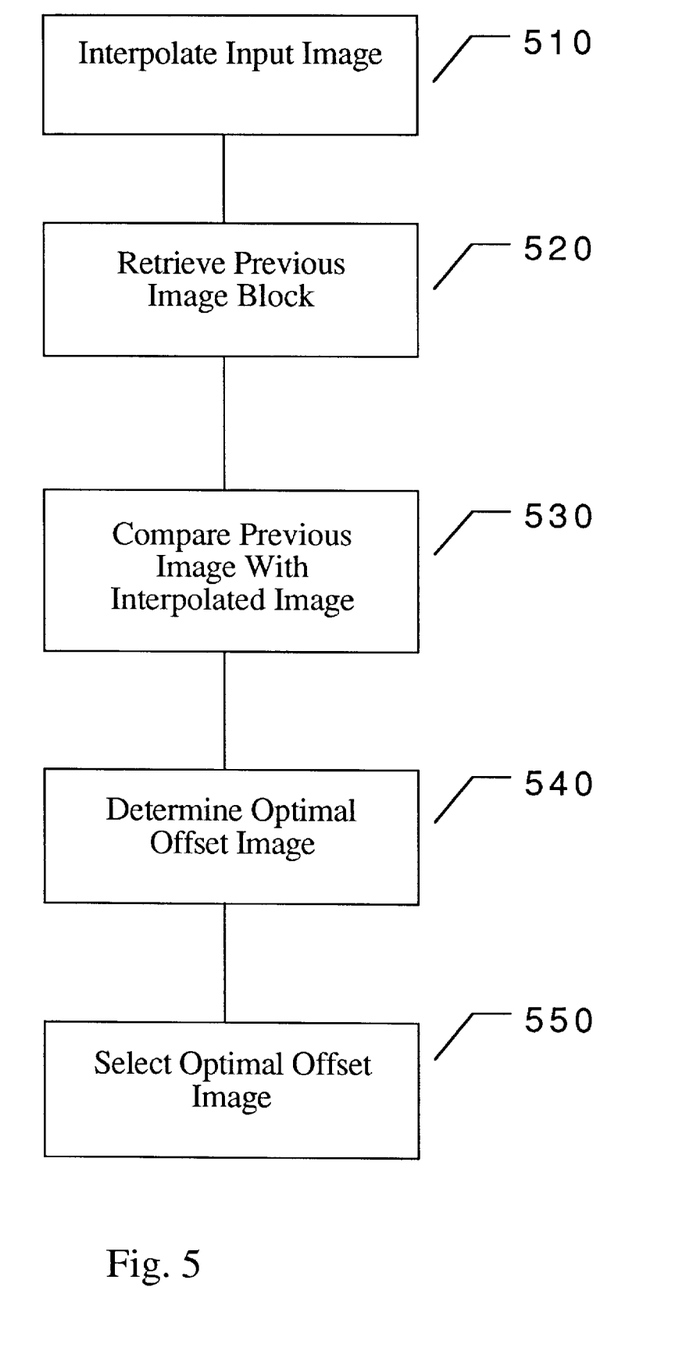
FIG. 5 illustrates a flow diagram of the block matching block of the adaptive image encoder.

FIG. 5 illustrates a flow diagram of the block matching block 220 of the adaptive image encoder 20. The flow diagram begins with step 510 where the interpolate input image block 330 receives an input image and interpolates the input image horizontally and vertically to produce an interpolated image. Next, the previous input image block 310 retrieves a last encoder input image in step 520 from the input of the encoder engine 240. Step 530 provides that the block offset comparator 340 compares the last encoder input image with the interpolated image to determine the optimal offset between the images. The last encoder input image provides an image block that is moved over the interpolated image as offsets between the pixels of the last encoder input image and the interpolated image are measured. In step 540, the block offset comparator 340 determines the best match image that minimizes the sum of the absolute difference between the pixels of the last encoder input image and the interpolated image representing the image most correlated with the last encoder input image. The flow diagram ends with step 550 when the minimum offset image block 350 receives the best match image for output to the image filtering block 230.

Figure 6:
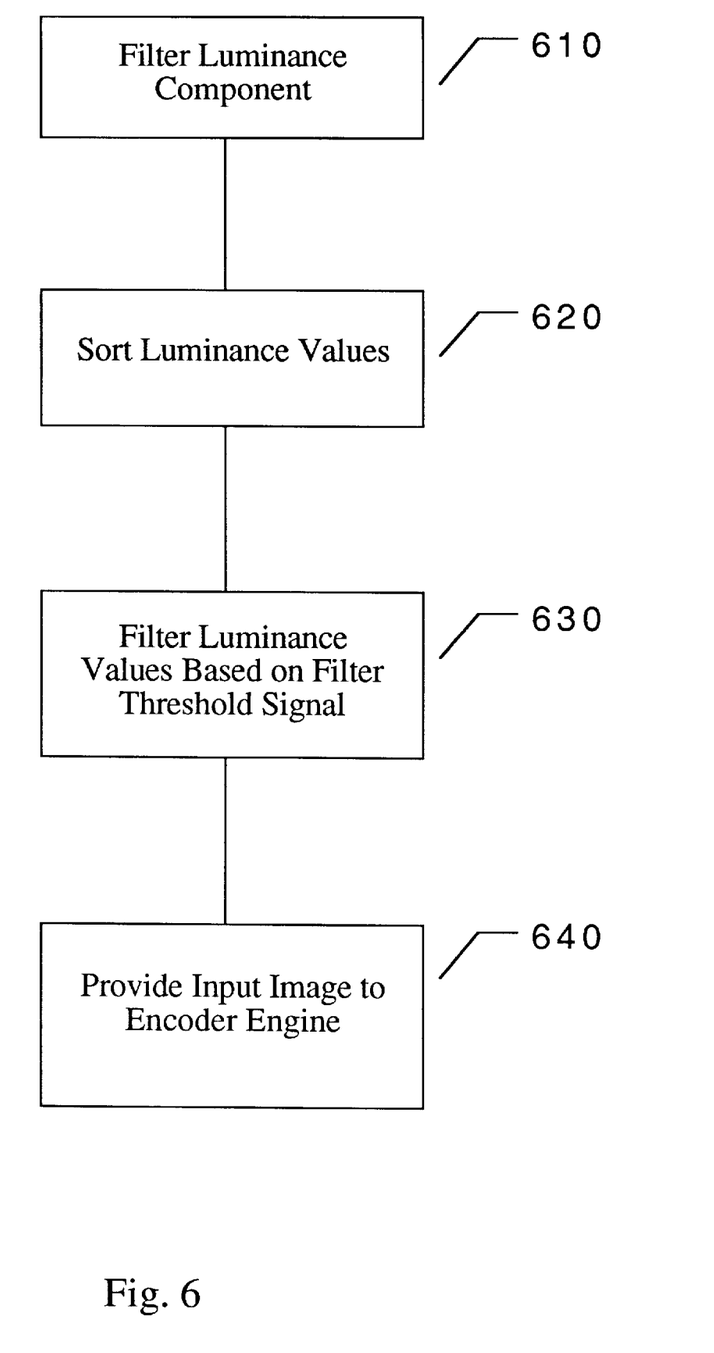
FIG. 6 illustrates a flow diagram of the image filtering block of the adaptive image encoder.

FIG. 6 illustrates a flow diagram of the image filtering block 230 of the adaptive image encoder 20. The flow diagram begins with step 610 where the high pass filter block 410 filters the luminance component of the input image received on line 225. As a high pass filter of the high pass filter block 419 filters the luminance component of the input image, absolute values of magnitudes of the high frequency component of the luminance are stored in a luminance component data base 420. Next, in step 620, resources of the luminance component data base 420 sorts the magnitudes of the high frequency component of the luminance in descending order along with their frequency of occurrence. The cumulative frequency of occurrence provides control information with respect to the percentage of the image which is filtered under control of the data rate control controller 250. Step 630 filters the luminance values to suppress the luminance values having high frequency components based upon the luminance filter threshold signal from the data rate controller 250. The flow diagram ends with step 640 where the luminance filtered image is transferred to the encoder engine 240 for encoding.

While the foregoing detailed description has described embodiments of the apparatus and methods for pre-processing image data of encoders in accordance with this invention, it is to be understood that the above description is illustrative only and not limiting of the disclosed invention. Obviously, many modifications and variations will be apparent to the practitioners skilled in this art. Accordingly, the apparatus and methods for pre-processing image data of encoders have been provided. Without pre-processing of image data, compression engines based on traditional DCT transformation of image block produce undesirable artifacts of the reconstructed images and inefficient encoding of image data. Thus, the pre-processing adaptive image encoder in accordance with this invention affords compressed image data that provide improved reconstructed images having reduced artifacts.

What is claimed is:

1. A video encoder comprising:
    image pre-processing resources including:
        image interpolation resources configured to interpolate an input image to provide an enlarged interpolated input image; and
        block matching resources coupled to the image interpolation resources having a last encoder input image to provide a best match input image from the enlarged interpolated input image in response to the last encoder input image;
    image filtering resources coupled to the block matching resources configured to suppress high frequency luminance components of the best match input image; and
    an encoder engine coupled to the image filtering resources to provide the last encoder input image to the block matching resources and to encode the best match input image producing encoded image data.

2. The video encoder of claim 1, wherein the interpolated image provides an enlarged input image.

3. The video encoder of claim 2, wherein the block matching resources includes block comparator resources which compares the last encoder input image with the interpolated input image to provide the best match input image.

4. The video encoder of claim 3, wherein the block comparator determines optimal image offset between the last encoder input image and a region of the interpolated image.

5. The video encoder of claim 4, wherein the optimal image offset includes an absolute difference between pixels of the last encoder input image and the interpolated image.

6. The video encoder of claim 1, wherein the image filtering resources includes high pass filtering resources which determines the high frequency luminance components of the best match input image.

7. The video encoder of claim 6, wherein the image filtering resources includes data base resources configured to store absolute values of the high frequency luminance components of the best match input image.

8. The video encoder of claim 7 further comprising data rate control resources coupled to the encoder engine having a filter threshold output configured to control encoded data rates from the encoder engine.

9. The video encoder of claim 8, wherein the image filtering resources includes luminance filtering resources having a filter threshold input to filter the high frequency luminance components in response to a filter threshold signal from the data rate control resources.

10. The video encoder of claim 9, wherein the luminance filtering resources suppresses the high frequency luminance components of the data base resources having higher absolute values to filter the rapid variations in luminance of the best match input image.

11. A computer readable media for encoding input images comprising:
    image filtering resources having a filter threshold input configured to suppress high frequency luminance components of an input image;
    image interpolation resources configured to interpolate the input image to provide an enlarged interpolated image;
    block matching resources coupled to the image interpolation resources and the image filtering resources having a last encoder input image to provide a best match image from the enlarged interpolated input image to the image filtering resources in response to the last encoder input image;
    an encoder engine coupled to the image filtering resources and configured to encode the input image; and
    data rate control resources coupled to the encoder engine and the image filtering resources having a filter threshold output configured to control encoded data rates of the encoder engine.

12. The computer readable media of claim 11, wherein the image filtering resources includes:
    high pass filtering resources which determines the high frequency luminance components of the input image; and
    data base resources configured to store absolute values of the high frequency luminance components of the input image.

13. The computer readable media of claim 12, wherein the image filtering resources includes luminance filtering resources to filter the high frequency luminance components in response to a filter threshold signal from the data rate control resources.

14. The computer readable media of claim 13, wherein the luminance filtering resources suppresses the high frequency luminance components of the data base resources having higher absolute values to filter the rapid variations in luminance of the input image.

15. A method of encoding input images comprising the steps:
    pre-processing an input image including the steps:
        interpolating the input image to provide an enlarged interpolated image;
        block matching a last encoder input image to provide a best match image from the enlarged interpolated image; and
        filtering the best match image to suppress high frequency luminance components of the best match image; and
    encoding the best match image to provide reduced encoded image data.

16. The method of encoding input images according to claim 15, further comprising the step controlling encoded image data rates by suppressing the high frequency luminance components of the best match image.

17. The method of encoding input images according to claim 16, wherein the step filtering includes the step of determining values for the high frequency luminance components of the best match image.

18. The method of encoding input images according to claim 17, wherein the step controlling encoded image data rates includes the step of suppressing higher values of the high frequency luminance components in response to the encoded image data rates.

* * * * *